(12) United States Patent
Liu et al.

(10) Patent No.: US 8,526,607 B2
(45) Date of Patent: Sep. 3, 2013

(54) IDENTITY AUTHENTICATION AND SHARED KEY GENERATION METHOD

(75) Inventors: Xianhong Liu, Sichuan (CN);
Hongjuan Kang, Sichuan (CN)

(73) Assignee: Sichuan Changhong Electric Co., Ltd., Mianyang (CN)

( * ) Notice: Subject to any disclaimer, the term of this patent is extended or adjusted under 35 U.S.C. 154(b) by 160 days.

(21) Appl. No.: 13/257,779

(22) PCT Filed: Nov. 25, 2009

(86) PCT No.: PCT/CN2009/075132
§ 371 (c)(1),
(2), (4) Date: Oct. 20, 2011

(87) PCT Pub. No.: WO2010/105479
PCT Pub. Date: Sep. 23, 2010

(65) Prior Publication Data
US 2012/0027205 A1    Feb. 2, 2012

(30) Foreign Application Priority Data

Mar. 20, 2009   (CN) .......................... 2009 1 0300983

(51) Int. Cl.
*H04L 9/00*   (2006.01)

(52) U.S. Cl.
USPC ................. 380/44; 380/30; 380/277; 726/4; 726/15

(58) Field of Classification Search
USPC ... 380/30, 44, 277; 726/4, 15; 713/155–156, 713/169, 171, 176, 189
See application file for complete search history.

(56) References Cited

U.S. PATENT DOCUMENTS

| | | | | |
|---|---|---|---|---|
| 6,154,841 A | * | 11/2000 | Oishi ............................ | 713/180 |
| 2002/0029337 A1 | * | 3/2002 | Sudia et al. .................... | 713/176 |
| 2004/0029562 A1 | * | 2/2004 | Sharon et al. ................. | 455/410 |
| 2004/0039906 A1 | * | 2/2004 | Oka et al. ...................... | 713/156 |
| 2004/0187001 A1 | * | 9/2004 | Bousis .......................... | 713/175 |
| 2006/0236116 A1 | * | 10/2006 | Patel ............................. | 713/183 |
| 2007/0127723 A1 | * | 6/2007 | Grobman ..................... | 380/278 |
| 2009/0136043 A1 | * | 5/2009 | Ramanna et al. ............. | 380/281 |

FOREIGN PATENT DOCUMENTS

| | | |
|---|---|---|
| CN | 101064610 | 10/2007 |
| CN | 101272251 | 9/2008 |
| CN | 101499908 | 8/2009 |
| WO | 2007/085779 | 8/2007 |

OTHER PUBLICATIONS

Mohamad Badra; Ibrahim Hajjeb, Key-Exchange Authentication Using Shared Secret, Mar. 2006, IEEE Computer Society, V39, pp. 58-66.*
Hongmei Deng; Anindo Mukherjee; Dharma P. Agrawal, Threshold and Identity-based Key Management and Authentication for Wireless Ad Hoc Network, Apr. 2004, IEEE Computer Society, V1, pp. 107-111.*
Zhihong Liu, Jianfeng Ma, Qiping Huang, SangJae Moon, Keying Material Based Key Pre-distribution Scheme, Jun. 2008, IEEE, pp. 218-221.*
International Search Report for international application No. PCT/CN2009/075132, dated Mar. 11, 2010 (4 pages).

* cited by examiner

*Primary Examiner* — Christopher Brown
*Assistant Examiner* — Fahimeh Mohammad
(74) *Attorney, Agent, or Firm* — Hamre, Schumann, Mueller & Larson, P.C.

(57) ABSTRACT

The invention relates to an identity authentication and key negotiation method. In order to overcome the defects in the prior art that security of authentication methods is not high, the invention discloses an identity authentication and shared key generation method. In the technical solution of the invention, a key authority issues a pair of public key $\vec{p_i}$ and private key $\vec{s_i}$ which are matched, and sets a correlation coefficient k, an offset vector $\vec{e}$, a regression coefficient a, a modulus m as well as $\vec{p_i}$, $\vec{s_i}$ and $\vec{e}$. Further, if a device i and a device j are any two devices, the matched public key and private key thereof satisfy the condition $k \times (\vec{p_i} \times \vec{s_j}^T + \vec{p_i} \times \vec{e}^T + a) \equiv k \times (\vec{p_j} \times \vec{s_i}^T + \vec{p_j} \times \vec{e}^T + a) \bmod m$; wherein the $\vec{s_i}^T$ is a transposed vector of the $\vec{s_i}$, the $\vec{e}^T$ is a transposed vector of the $\vec{e}$, and the $\vec{s_j}^T$ is a transposed vector of the $\vec{s_j}$. Provided that a device A is an authentication initiator, a matched public key thereof is $\vec{p_A}$ and a matched private key thereof is $\vec{s_A}$; and a device B is an authentication participant, a matched public key thereof is $\vec{p_B}$ and a matched private key thereof is $\vec{s_B}$. The authentication between the device A and the device B succeeds under the following condition: $k \times (\vec{p_A} \times \vec{s_B}^T + \vec{p_A} \times \vec{e}^T + a) \equiv k \times (\vec{p_B} \times \vec{s_A}^T + \vec{p_B} \times \vec{e}^T + a) \bmod m$. The invention is particularly applicable to chips.

10 Claims, No Drawings

IDENTITY AUTHENTICATION AND SHARED KEY GENERATION METHOD

FIELD OF THE INVENTION

The invention relates to an encryption technology, in particular to an identity authentication and key negotiation method.

DESCRIPTION OF THE RELATED ART

Identity authentication and key negotiation are security basis in the fields of communication, electronic commerce, finance, data transfer, content protection, etc. The authentication aims to confirm identities of two participants, allowing preparations for subsequent security communication and assigning relevant authorities.

The identity authentication can be technically divided into three types: password-based authentication, symmetric key-based authentication and public key-based authentication. Based on implementation methods, the identity authentication can be divided into authentication with a third party participation and authentication without a third party participation. At present, the password-based authentication is still widely used in the fields of Internet, finance, etc. owing to simplicity thereof, e.g. password login of e-mail accounts and passwords of bank cards. The symmetric key-based authentication is also widely used, e.g. internal authentication and external authentication of IC cards. Both authentications are simple and practice, but can be easily cracked due to low security. Such two authentications are practical only in the occasions without high security requirement or occasions with high security requirement and with security guaranteed by other supplementary methods. With enhancing security requirement, the public key-based authentication is generally used in situations with the higher security requirement, especially the PKI (Public Key Infrastructure) mechanism which is widely used in the fields of Internet, finance, electronic commerce, etc. At present, algorithms widely used in the public key-based authentication are RSA and ECC which are characterized high security and the disadvantage of complex operations and more resources consumption, resulting in large size and high cost of chip implementation. This is also one reason why the ECC algorithm has appeared for many years but is not supported by chips on a large scale. In addition, the public key-based authentication generally employs a digital certificate to confirm identity of the other party, and the authentication process requires exchanging certificates and verifying validity of the certificates for both parities, occupying certain data bandwidth and large computing resources. Thus, such authentication method may not be implemented in some cases, e.g. authentication on IC cards. Chinese patent CN101064610A discloses an identity authentication technique and a key negotiation (sharing) technique, and the main implementation methods thereof are as follows:

1) A key authority generates a pair of public key/private key from a key database thereof to each object; all the device differ in the public key/private key, thus allowing to implement revocation of a specific device; and provided the public key of the device is $\vec{p}=(p1\ p2\ K\ p_n)$ $\vec{s}=(s1\ s2\ L\ sn)$, in which both $\vec{p}$ and $\vec{s}$ are vectors of $1 \times n$;

2) each device stores the public and private key therein; in which the private key requires to be stored secret and cannot be accessed by other devices, and the public key can be accessed by other devices;

3) provided that a public key of an authentication initiator is $\vec{p}_1$, a private key thereof is $\vec{S}_1$, and a public key of an authentication participant is $\vec{p}_2$ and a private key thereof is $\vec{S}_2$; the authentication initiator initiates an authentication request to firstly generate a random number R which is transferred to the authentication participant together with the public key thereof; and the authentication participant receives the authentication request and transfers the public key $\vec{p}_2$ thereof to the authentication initiator after receiving the random number R and the public key $\vec{p}_1$ therefrom;

4) the authentication participant starts to compute $K_2 = \vec{p}_1 \times \vec{S}_2^T$. As $\vec{p}_1$ is a vector of $1 \times n$ and $\vec{S}_2^T$ is a transposed vector of $\vec{S}_2$ (i.e. a vector of $n \times 1$), the product $K_2$ therebetween is a constant scalar; and then the authentication participant computes $y_2 = f(K_2, R)$ and transfers a result thereof to the authentication initiator;

5) the authentication initiator computes $K_1 = \vec{p}_2 \times \vec{S}_1^T$. As $\vec{p}_2$ is a vector of $1 \times n$ and $\vec{S}_1^T$ is a vector of $n \times 1$, the product $K_1$ therebetween is a constant scalar, Then, the authentication initiator computes $y_1 = f(K_1, R)$ and transfers a result thereof to the authentication participant.

6) The authentication initiator and the authentication participant compare $y_1$ with $y_2$. If $y_1$ and $y_2$ are equal, then the authentication succeeds; otherwise the authentication fails;

7) $y = f(K, R)$ is generally predetermined in advance, and the unidirectional algorithm in cryptography is employed, e.g. HASH algorithm and encryption algorithm;

8) as each pair of public key $\vec{p}$/private key $\vec{S}$ is matched, a blacklist function can also be used in the system; that is, the public key $\vec{p}$ is defined as a member of the blacklist to implement the function of a digital certificate blacklist.

The method that the algorithm is applied to the key negotiation is as follows:

1) an trusted authority TA allocates two index vectors $\vec{\alpha} = (\alpha_1\ \alpha_2\ K\ \alpha_n)_{1 \times n}$ and $\vec{\beta} = (\beta_1\ \beta_2\ K\ \beta_n)_{1 \times n}$ to each device; in which $\alpha_i \in Zp$ is a public parameter and $\beta \in Zp$ is a secret parameter; and any two devices U and V are required to have $$\vec{\alpha}_V \times \vec{\beta}_U^T \bmod p = \vec{\alpha}_U \times \vec{\beta}_V^T \bmod p;$$

2) provided that both parties participating in communication are U and V, then the U and the V have their respective index vectors $\vec{\alpha}_u$, $\vec{\beta}_u$, $\vec{\alpha}_v$ and $\vec{\beta}_v$.

3) the U generates a random number $R_1$ initially and transfers $R_1$ and $\vec{\alpha}_u$ to the V;

4) the V transfers $\vec{\alpha}_v$ to U after receiving $R_1$ and $\vec{\alpha}_u$;

5) the U begins to compute $$K_{V,U} = \vec{\alpha}_V \times \vec{\beta}_U^T \bmod p,$$

and then compute $$K = f(K_{V,U}, R_1);$$

6) the V begins to compute $$K_{U,V} = \overset{\rho}{\alpha}_U \times \overset{\rho T}{\beta}_V \bmod p;$$

and then compute $$K = f(K_{U,V}, R_1);$$

where, f( ) is a predetermined function that can be a hash function, cryptographic function or other one-way function or combinations thereof;

7) the U generates a random number $R_U$ again and transfers $R_U$ to V; and then computes $C_{U,V} = E(R_U, K)$;

8) the V also generates a random number $R_V$ and transfers $R_V$ to U; and then computes $C_{V,U} = E(R_V, K)$;

9) the U uses K computed thereby as an encrypted password to encrypt $R_V$ through $C_U = E(Rv, K)$ and transfer a result $C_U$ to V;

10) the V uses K computed thereby as an encrypted password to encrypt $R_U$ through $C_V = E(R_U, K)$, and then transfer a result $C_V$ to U;

11) the U receives $C_V$ transferred from V and compares $C_V$ and $C_{U,V}$; if such two values are equal, the other party is considered to have generated a same key;

12) after receiving $C_U$ transferred from the U, the V compares $C_U$ and $C_{V,U}$; if such two values, the other party is considered to have generated the same key.

If all the processes succeed; then both parties use K as a common key for subsequent communication. Alternatively, the K is used to encrypt the transferred key for the subsequent communication.

Although the methods are simply implemented, certain security issues still exist in theory. That is, if enough public keys and private keys are obtained theoretically (reported in related literature), a third party can freely generate public keys and private keys fully compatible with the original system.

SUMMARY OF THE INVENTION

The technical problem to be solved by the invention is to provide an identity authentication and shared key generation method against the defects in the prior art.

A technical solution for solving the technical problem in the invention is an identity authentication and shared key generation method, comprising a key authority for issuing a public key and a private key to a device; each device having at least a pair of public key $\overset{uuu}{P}_i$ and private key $\overset{u}{S}_i$; and the key authority setting a correlation coefficient k, a regression coefficient a, a modulus m and an offset vector $\vec{e}$ wherein the k and the a are natural numbers and the k is not equal to zero, the $\overset{uuu}{P}_i$, the $\overset{u}{S}_i$ and the $\vec{e}$ are vectors of 1×n, and the n is a natural member not less than 2; a public key of an authentication initiator being set as $\vec{p}_A$ and a private key thereof being set as $\vec{S}_A$, a public key of an authentication participant being set as $\vec{P}_B$ and a private key thereof being set as $\vec{s}_B$; and characterized by comprising the flowing steps:

a initiating, by the authentication initiator, an authentication request and transferring the public key $\vec{p}_A$ thereof to the authentication participant;

b transferring, by the authentication participant, the public key $\vec{p}_B$ thereof to the authentication initiator after receiving the authentication request;

c computing, by the authentication initiator, $$M_A = k \times (\vec{p}_B \times \vec{s}_A^T + \vec{p}_B \times \vec{e}^T + a) \bmod m;$$

computing, by the authentication participant, $$M_B = k \times (p_A \times s_B^T + p_A \times e^T + a) \bmod m;$$

wherein the $\vec{s}_A^T$ is a transposed vector of the $\vec{s}_A$, the $\vec{e}^T$ is a transposed vector of the $\vec{e}$, and the $\vec{s}_B^T$ is a transposed vector of the $\vec{s}_B$; and d considering that authentication is successful if the $M_A$ and the $M_B$ as bases of authentication are identical, or considering that the authentication fails if the $M_A$ and the $M_B$ are different.

The advantages of the invention are as follows:

(1) the public key and private key pair accessed by the devices can not directly constitute a linear equation to crack the system, so its security is higher;

(2) Certain measures can be taken for selection of the public key $\overset{uuu}{P}_i$ and the private keys $\overset{u}{S}_i$, e.g. keeping certain linear correlation, then the invention cannot be cracked easily in theory; and (3) If parameters of the solution are selected properly, a multiplication can be converted into an addition, which is of great help to reduce cost owing to simple implementation and small chip size, for example, each member among n-dimension vectors are selected to be 2bit; the $M^A$ and the $M^B$ can be obtained by an additive operation.

DETAILED DESCRIPTION OF THE PREFERRED EMBODIMENTS

The technical solution of the invention will be described in detail in combination with examples.

First, a key authority is established to issue a public key and a private key to a device. In addition to a pair of matched public key $\overset{uuu}{P}_i$ and private key $\overset{u}{S}_i$, each device can store public keys of other devices as a valid identity list. The private keys requires to be secret kept by the holder and cannot be disclosed. The key authority sets a correlation coefficient k, an offset vector $\vec{e}$, a regression coefficient a and a modulus m, in which the k and the a are natural numbers and the k is not equal to zero. These parameters are only authorized to a software developer or chip developer and are not disclosed.

The $\overset{uuu}{P}_i$, the $\overset{u}{S}_i$ and the $\vec{e}$ are vectors of 1×n and the n is a natural number not less than 2. The n is generally not less than 20; the greater the dimension, the stronger the security is and the more complex the computation is. For application to a chip, it is ok if n=20. If a device i and a device j are any two devices, the matched public key and private key thereof satisfy the condition $k \times (\vec{p}_i \times \vec{s}_j^T + \vec{p}_i \times \vec{e}^T + a) \equiv k \times (\vec{p}_j \times \vec{s}_i^T + \vec{p}_j \times \vec{e}^T + a) \bmod m$; in which the $\vec{s}_i^T$ is a transposed vector of the $\vec{s}_i$, the $\vec{e}^T$ is a transposed vector of the $\vec{e}$, and the $\vec{s}_j^T$ is a transposed vector of the $\vec{s}_j$. Provided that the device A is an authentication initiator, a matched public key thereof is $\vec{p}_A$ and a matched private key thereof is $\vec{s}_A$; and the device B is an authentication participant, a matched public key thereof is $\vec{p}_B$ and a matched private key thereof is $\vec{s}_B$. The condition for successful authentication between the device A and the device B (collectively known as both authentication parties) is that the following congruence expression is true:

$$k \times (\vec{p}_A \times \vec{s}_B^T + \vec{p}_A \times \vec{e}^T + a) \equiv k \times (\vec{p}_B \times \vec{s}_A^T + \vec{p}_B \times \vec{e}^T + a) \bmod m \qquad (1)$$

where, the $\vec{s}_A^T$ is a transposed vector of the $\vec{s}_A$, the $\vec{e}^T$ is a transposed vector of the $\vec{e}$, and the $\vec{s}_B^T$ is a transposed vector of the $\vec{s}_B$.

Example 1

The invention is applied to one-way authentication and key negotiation.

One-way authentication refers to such a case that the device A authenticates the device B but the device B does not need to authenticate the device A.

First, the key authority allocates a pair of public key $\overset{\text{uu}}{P}_i$ and private key $\overset{u}{S}_i$ from a key database thereof to each object (device); the key database of the key authority must be secret and the private key of the authentication object must also be secret. All the device differ in the public key/private key thereof to implement revocation of a specific device. Each device keeps the public key/private key therein. The private key requires to be kept secret and cannot be accessed by other devices, and the public key can be accessed by other devices.

Second, provided that a matched public key of an authentication initiator is $\vec{p}_A$ and a private key thereof is $\vec{S}_A$, and a public key of an authentication participant is $\vec{p}_B$ and a private key thereof is $\vec{S}_B$. The authentication initiator initiates an authentication request to firstly generate a random number $R_A$ which is transferred to the authentication participant together with the public key $\vec{p}_A$ thereof.

Third, the authentication participant receives the authentication request; after receiving a random number $R_A$ and a public key $\vec{p}_A$ from the authentication initiator, generates a random number $R_B$ which is transferred to the authentication initiator together with the public key thereof $\vec{p}_B$.

Forth, after receiving information on the public key from each other, the authentication initiator and the authentication participant examine whether the public key thereof is within their respective blacklist. If the public key is within the blacklist, the subsequent process stops; and if the public key is not within the blacklist, the subsequent process continues.

Fifth, the authentication initiator computes $M_A$:

$$M_A = k \times (\vec{p}_B \times \vec{s}_A^T + \vec{p}_B \times \vec{e}^T + a) \bmod m \qquad (2)$$

The authentication initiator computes authentication data $K\_M_A$:

$$K\_M_A = B\_E(M_A, R_A \| R_B) \bmod m \qquad (3)$$

The authentication initiator computes an authentication code $C_A$:

$$C_A = B\_E_1(K\_M_A, R_A \| R_B) \bmod m \qquad (4)$$

The authentication participant computes $M_B$:

$$M_B = k \times (\vec{p}_A \times \vec{s}_B^T + \vec{p}_A \times \vec{e}^T + a) \bmod m \qquad (5)$$

The authentication participant computes authentication data $K\_M_B$:

$$K\_M_B = B\_E(M_B, R_A \| R_B) \bmod m \qquad (6)$$

The authentication participant computes an authentication code $C_B$:

$$C_B = B\_E_1(K\_M_B, R_A \| R_B) \bmod m \qquad (7)$$

The authentication participant transfers the $C_B$ to the authentication initiator. The authentication initiator waits for the $C_B$ returned from the other party. If the $C_B$ is not received within a given time, the authentication fails.

The authentication initiator compares the received $C_B$ with the computed $C_A$. If such two values are identical, identity of the other party is considered valid, a common key $K\_M_A$ is generated, and the authentication succeeds. If such two values are different, the authentication fails.

After the authentication succeeds, both authentication parties take the $K\_M_A$ as an initial value of the common key to generate a communication key therebetween or directly take the $K\_M_A$ as a key for subsequent communication.

As the circumstances may require, only one of the authentication initiator and the authentication participant generates and transfers the random number, and the other party does not need to generate and transfer the random number. Provided that the device B does not generate a random number, $R_A \| R_B$ in the operation changes to $R_A$, for example, $K\_M_A = B\_E (M_A, R_A)$, and $C_A = B\_E_1(K\_M_A, R_A)$.

Where, the $R_A \| R_B$ means that the $R_A$ and the $R_B$ are directly connected in series to form a number. For example, if the $R_A$ equals 10234 and the $R_B$ equals 88756, then the $R_A \| R_B$ equals 1023488756.

For authentication only, the operation of formulae (4) and (7) is unnecessary. The authentication data $K\_M_A$ can directly be compared with the authentication data $K\_M_B$. If the data are identical, the authentication succeeds.

Where, B_E ( ) is defined as an operation, e.g. encryption operation, HASH operation and HMAC operation. The B_E ( ) and B_E$_1$( ) can be identical or different. The operation of formulae (3), (4), (5), (6) and (7) is to increase security during data transfer, Example 2

The solution is applied to two-way authentication and key negotiation.

Two-way authentication refers to such a case that a device A and a device B need to mutually confirm identity.

(1) Provided that a public key of an authentication initiator (device A) is $\vec{p}_A$ and a private key thereof is $\vec{S}_A$, and a public key of an authentication participant (device B) is $\vec{p}_B$ and a private key thereof is $\vec{S}_B$.

(2) The authentication initiator initiates an authentication request to first generate a random number $R_A$ which is transferred to the authentication participant together with the public key $\vec{p}_A$ thereof.

(3) The authentication participant receives the authentication request; after receiving the random number $R_A$ and the public key $\vec{p}_A$ from the authentication initiator, generates a random number $R_B$ which is transferred to the authentication initiator together with the public key thereof $\vec{p}_B$.

(4) After receiving the public key from each other, the authentication initiator and the authentication participant examine whether the public key thereof is within their respective blacklist. If the public key thereof is within their respective blacklist, the subsequent process stops; if the public key thereof is not within their respective blacklist, the subsequent process continues.

(5) The authentication initiator computes $M_A$:

$$M_A = k \times (\vec{p_B} \times \vec{s_A}^T + \vec{p_B} \times \vec{e}^T + a) \bmod m \quad (8)$$

The authentication initiator computes authentication data $K\_M_a$:

$$K\_M_A = B\_E(M_A, R_A) \bmod m \quad (9)$$

The authentication initiator computes authentication codes $C_A$ and $C_B$:

$$C_A = B\_E_1(K\_M_A, R_A) \bmod m \quad (10)$$

$$C_B = B\_E_1(K\_M_A, R_B) \bmod m \quad (11)$$

The authentication participant computes $M_B$:

$$M_B = k \times (\vec{p_A} \times \vec{s_B}^T + \vec{p_A} \times \vec{e}^T + a) \bmod m \quad (13)$$

The authentication participant computes authentication data $K\_M_B$:

$$K\_M_B = B\_E(M_B, R_A) \bmod m \quad (14)$$

The authentication participant computes authentication codes $C'_A$ and $C'_B$:

$$C'_A = B\_E_1(K\_M_B, R_A) \bmod m \quad (15)$$

$$C'_B = B\_E_1(K\_M_B, R_B) \bmod m \quad (16)$$

(6) The authentication participant transfers the $C'_A$ to the authentication initiator and waits for the $C_B$ returned therefrom within a given time. If the $C_B$ is not received within the given time, then the authentication fails.

(7) The authentication initiator compares the received $C'_A$ with the computed $C_A$. If such two values are identical, identity of the other party is considered valid, and a common key ($K\_M_A$ or $K\_M_B$) is generated; otherwise the authentication fails.

(8) The authentication initiator transfers the $C_B$ to the authentication participant and waits for the $C'_A$ returned therefrom. If the $C'_A$ is not received within a given time, then the authentication fails.

(9) The authentication participant compares the received $C_B$ with the computed $C'_B$. If such two values are identical, identity of the other party is considered valid, and a common key ($K\_M_A$ or $K\_M_B$) is generated; otherwise the authentication fails.

(10) After the authentication succeeds, both authentication parties take the $K\_M_A$ as an initial value of the common key to generate a communication key therebetween or directly take the $K\_M_A$ as a key for subsequent communication.

The invention claimed is:

1. An identity authentication and shared key generation method, comprising a key authority for issuing a public key and a private key to a device; each device having at least a pair of public key $P_i$ and private key $S_i$; the key authority setting a correlation coefficient k, a regression coefficient a, a modulus m and an offset vector e wherein the k and the a are natural numbers and the k is not equal to zero, the $\vec{p_i}$, the $\vec{s_i}$ and the $\vec{e}$ are vectors of 1×n, and the n is a natural member not less than 2; a public key of an authentication initiator device being set as $\vec{p_A}$ and a private key thereof being set as $\vec{s_A}$, a public key of an authentication participant being set as $\vec{p_B}$, and a private key thereof being set as $\vec{s_B}$; the method comprising the following steps:

a initiating, by the authentication initiator device, an authentication request and transferring the public key $\vec{p_A}$ thereof to the authentication participant;

b transferring, by the authentication participant, the public key $\vec{p_B}$ thereof to the authentication initiator device after receiving the authentication request;

c computing a first authentication value $M_A$, by the authentication initiator device, $$M_A = k \times \left( \vec{p_B} \times \vec{s_A}^T + \vec{p_B} \times \vec{e}^T + a \right) \bmod m;$$

computing a second authentication value $M_B$, by the authentication participant, $$M_B = k \times \left( \vec{p_A} \times \vec{s_B}^T + \vec{p_A} \times \vec{e}^T + a \right) \bmod m;$$

wherein the $\vec{s_A}^T$ is a transposed vector of the $\vec{s_A}$, the $\vec{e}^T$ is a transposed vector of the $\vec{e}$, and the $\vec{s_B}^T$ is a transposed vector of the $\vec{s_B}$; and d considering that authentication is successful if the first authentication value $M_A$ and the second authentication value $M_B$ as bases of authentication are identical, or considering that the authentication fails if the first authentication value $M_A$ and the second authentication value $M_B$ are different.

2. The identity authentication and shared key generation method according to claim 1, wherein the n is not less than 20.

3. The identity authentication and shared key generation method according to claim 1, wherein validity of a public key received from the other party is judged in the steps a and b; if the public key is valid, the subsequent steps are performed; otherwise the subsequent steps are stopped.

4. The identity authentication and shared key generation method according to claim 1, wherein the public key $\vec{p_i}$ and the private key $\vec{s_i}$ have linear correlation.

5. The identity authentication and shared key generation method according to claim 1, wherein the first authentication value $M_A$ can be taken as an initial value of a shared key of both authentication parties to generate a communication key thereof if the authentication succeeds.

6. The identity authentication and shared key generation method according to claim 1, wherein the step a further comprises generating, by the authentication initiator device, a random number $R_A$ and transferring the number to the authentication participant;

the step c further comprises computing, by the authentication initiator device, the $R_A$ and the first authentication value $M_A$ to obtain an intermediate value $B\_E(M_A, R_A)$;

performing, by the authentication participant, the same operation for the $R_A$ and the second authentication value $M_B$ to obtain an intermediate value $B\_E(M_B, R_A)$; and the step d further comprises taking the intermediate value $B\_E(M_A, R_A)$ and the intermediate value $B\_E(M_B, R_A)$ as bases of authentication, and considering that the authentication succeeds if such two values are identical, or considering that the authentication fails if such two values are different.

7. The identity authentication and shared key generation method according to claim 6, wherein the intermediate value $B\_E(M_A, R_A)$ is taken as an initial value of a shared private key of both authentication parties to generate a communication key thereof if the authentication succeeds.

8. The identity authentication and shared key generation method according to claim 6, wherein the step b further comprises generating, by the authentication participant, a random number $R_B$ and transferring the number to the authentication initiator device;

the step c further comprises computing, by the authentication initiator device, the first authentication value $M_A$, the $R_A$ and the $R_B$ to obtain an intermediate value $B\_E(M_A, R_A, R_B)$ and performing, by the authentication participant, the same computation for the second authentication value $M_B$, the $R_A$ and the $R_B$ to obtain an intermediate value $B\_E(M_B, R_A, R_B)$; and the step d further comprises taking the intermediate value $B\_E(M_A, R_A, R_B)$ and the intermediate value $B\_E(M_B, R_A, R_B)$ as bases of authentication, and considering the authentication succeeds if such two values are identical, or considering the authentication fails if such two values are different.

9. The identity authentication and shared key generation method according to claim 8, wherein the intermediate value $B\_E(M_A, R_A, R_B)$ is taken as an initial value of a shared key of both authentication parties to generate a communication key thereof if the authentication succeeds.

10. The identity authentication and shared key generation method according to claim 1, wherein the method can be used for one-way authentication from the authentication initiator device to the authentication participant and mutual authentication between the authentication initiator device and the authentication participant.

\* \* \* \* \*